United States Patent [19]

Ogata et al.

[11] 4,104,910
[45] Aug. 8, 1978

[54] PRESSURE MEASURING METHOD

[75] Inventors: Yasuhiro Ogata; Noburo Hibino, both of Fujimiya, Japan

[73] Assignee: Fuji Photo Film Co., Ltd., Minami-ashigara, Japan

[21] Appl. No.: 760,306

[22] Filed: Jan. 18, 1977

[30] Foreign Application Priority Data

Jan. 20, 1976 [JP] Japan .................................. 51-5180

[51] Int. Cl.² .............................................. G01L 1/00
[52] U.S. Cl. ................................................ 73/141 R
[58] Field of Search ................. 73/141 R, 88 R, 88 F; 428/914, 307, 306

[56] References Cited

U.S. PATENT DOCUMENTS

| 2,647,400 | 8/1953 | Gaines | 73/88 R |
| 3,469,439 | 9/1969 | Roberts et al. | 73/141 R |

Primary Examiner—Anthony V. Ciarlante
Attorney, Agent, or Firm—Sughrue, Rothwell, Mion, Zinn and Macpeak

[57] ABSTRACT

In a pressure measuring method by interposing a pressure-sensitive recording sheet between the parts to be measured and pressing the recording sheet with the parts, line pressures, face pressures, etc., can be precisely measured without need of highly skilled techniques and complicated calculations and unaccompanied by localized uneven recordings by pressing the recording sheet through a sheet material having regular embossed patterns.

9 Claims, 3 Drawing Figures

TRIANGLE PATTERN

PRESSURE MEASURING METHOD

BACKGROUND OF THE INVENTION

1. Field of the Invention

The present invention relates to a pressure measuring method. In particular, it relates to a pressure measuring method wherein the pressure measurement is performed by pressing a pressure-sensitive recording sheet interposed between the parts to be measured through a sheet meterial having regular embossed patterns.

2. Description of the Prior Art

Recently, it has become of interest to mechanically measure various line pressures, face pressures, etc., such as the clamping pressure of bolts for general machinery and tools; the pressing condition of motor brake gears, the molding pressure and mold clamping pressure on molding thermoplastic resins or thermosetting resins; the contact pressure between a resin in a mold and the wall of the mold; the molding pressure in a mold; the contact face pressure of springs; the clamping face pressure in connected portions of fuel carburettors, fuel pipes, fuel tanks, etc.; the collision pressure between the human body and instruments or implements at car crash; the line pressure and face pressure of a rubber roll and a plastic roll; checking of the effective limit or the effective state of gasket seals; the oil pressure in brake gears; the contact condition of gear teeth; the contact face pressure between solid materials; the clamping pressure of bolts; checking the contact condition of a cock in a cock valve; checking of the contact condition between curved surfaces; checking of the contact condition of rolling rolls for steel in operation; the pressure distribution of the sole of a human foot on a floor; the pressure distribution between a human body and a chair or sofa; and the like. In spite of this, a method capable of measuring pressure in a simple manner has not yet been developed or if any, the method is very complicated.

That is to say, known conventional methods of measuring pressures such as face pressures and line pressures, are, for instance, a method wherein a strain gauge utilizing a relation between stress and strain is employed, a method wherein a load meter is used, and method wherein a pressure-sensitive paint (strain-sensitive lacquer) is used. However, these conventional methods have the following disadvantages.

That is, in using a strain gauge, e.g., described in detail in, for instance, J. Yarnell; *Strain Gauge* published by Corona Sha, for the measurement of face pressures, line pressures, etc., not only large pieces of equipment such as an amplifier, a detector, a recorder, etc., are required but also highly skilled techniques and complicated calculations of the strength of materials are required for operating these equipment. Furthermore, the materials to be measured in the method must have flat surfaces due to the characteristics of the method.

Also, in the method using a pressure-sensitive paint (strain-sensitive lacquer), unevenness in coating tends to occur, problems due to the adhesivity of the pressure-sensitive paint exist, and further the method is complicated.

In using a load meter for measuring pressures, it is impossible to reduce the size of the equipment, which results in use of a load meter being inappropriate for the measurement of pressures such as face pressure, line pressure, etc.

Still further, a method is known wherein a pressure-sensitive laminate is used as disclosed in U.S. Pat. No. 3,647,504. In this method, a mono-ply type pressure-sensitive recording paper carrying microcapsules of two or more different kinds each having a different wall thickness and each containing a marking liquid with a different color is used. Thus, only a specific kind of microcapsules is ruptured in response to each specific pressure to release the colored marking liquid in those microcapsules and hence the extent of the pressure applied can be detected by observing the color tone formed.

However, although the method described above can be used to determine roughly the extent of the pressure applied, it is difficult, with such a method, to detect precisely or correctly the value of the pressure applied.

To overcome the disadvantages in these conventional techniques, a method has been used wherein a pressure-sensitive sheet is brought into contact with a part where pressure is to be measured and a pressure is applied to the recording sheet through the part to form color, whereby the value of the pressure applied is detected from the change in optical density of the colored marks or images formed on the pressure-sensitive recording sheet. In this method, the coloring of the pressure-sensitive recording sheet can be performed by the contact of a color former and a color developer under pressure. The advantage of this method is that pressures such as face pressure, line pressure, etc., at the portions to be measured can be measured without need of large pieces of equipment, highly skilled operation techniques, and complicated calculations.

However, the support of the recording sheet used in this method has generally a flat or irregular and uneven surface and hence the colored marks or images formed by pressing the recording sheet show an uneven color density, which makes it impossible to detect precisely the value of the pressure applied.

It is believed that when a support having an irregular and uneven surface is used, the irregular and uneven patterns are transferred to cause a color density unevenness but it has not yet been clarified why such a color density unevenness occurs in using a support having a flat surface. The reason is assumed to be as follows.

The first reason is believed to originate in the properties of the microcapsules which contribute to coloring. That is, it is believed that since the pressure is directly applied to all the microcapsules containing a color former, the rupture of the microcapsules is greatly influenced by the unevenness in particle size of the microcapsules or in the thickness of the wall of the microcapsules; which results in an irregular localized unevenness in optical density of recorded marks or images occurring.

The second reason is believed to originate in the influence of gases such as air, etc., present at the portions to be measured. That is, it is believed that when a pressure is applied to the pressure-sensitive recording sheet having a flat surface at the part to be measured, a gas present at the interface between the recording sheet and the surface of a material in contact with the recording sheet is confined locally, which causes an unevenness in pressure applied to the pressure-sensitive recording sheet and results subsequently in the irregular localized unevenness in optical density of the colored marks or images.

SUMMARY OF THE INVENTION

The present invention relates, therefore, to a pressure measuring method which can be performed without the above-described disadvantages occurring.

Thus, a first object of this invention is to provide a pressure measuring method which can be used to measure pressures such as face pressure, line pressure, etc., by a simple manner. That is, an object is to provide a pressure measuring method which can be used to detect pressures such as face pressure, line pressure, etc., at the portions to be measured without need of large pieces of equipment, highly skilled operation techniques, and complicated calculations.

A second object of this invention is to provide a pressure measuring method which can be used to detect precisely the pressure at the portions to be measured by forming clear colored recorded marks or images. That is, an object is to provide a pressure measuring method which can be used to detect precisely the value of the pressure applied without an irregular localized unevenness in the optical density of the colored marks formed by pressing occurring.

The above-indicated objects of this invention are attained by pressing a pressure-sensitive recoridng sheet interposed between the parts to be measured through a sheet material having regular embossed patterns.

DETAILED DESCRIPTION OF THE INVENTION

Figure 1:
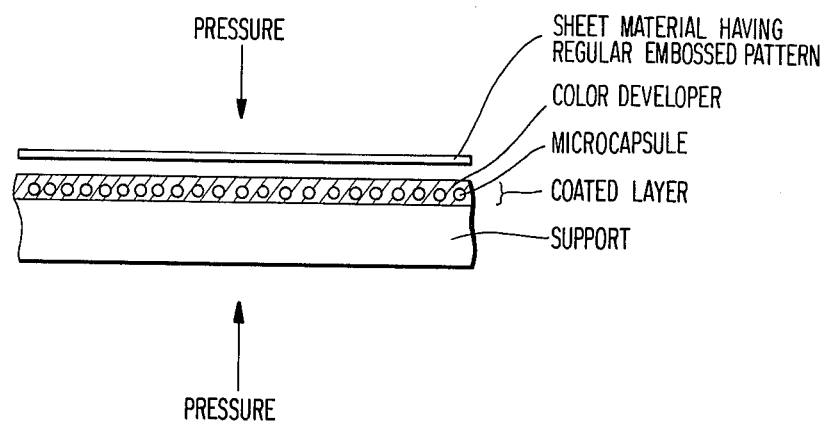
FIG. 1 shows a mono-ply pressure-sensitive recording sheet in use in measuring pressure in accordance with the present invention.
Figure 2:
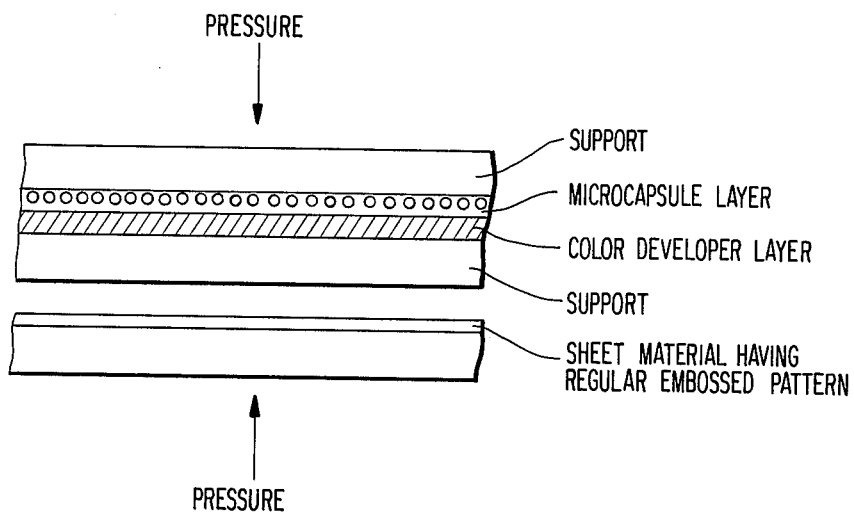
FIG. 2 shows a two-ply type pressure-sensitive recording sheet in use in measuring pressure in accordance with the present invention.
Figure 3:
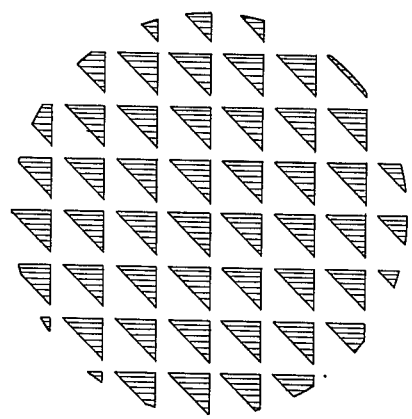
FIG. 3 is a planar view of an example of a triangular embossed pattern of sheet material having regular embossed patterns.

The pressure-sensitive recording sheet used in this invention can be a two-ply type recording sheet assembly comprising a sheet having thereon a layer of a color former and a sheet having thereon a layer of a color developer, e.g., as disclosed in U.S. patent application Ser. No. 562,325, filed Mar. 26, 1975 and U.S. Pat. No. 3,469,439, or can be a mono-ply type recording sheet comprising a sheet having coated thereon a color former and a color developer, e.g., as disclosed in U.S. patent application Ser. No. 729,627, filed Oct. 5, 1976 (corresponding to German Patent Application (OLS) 2,513,526).

The color former used in this invention can be present in a coating layer but it is most preferred that the color former or color formers be encapsulated in microcapsules. The color former or color formers can be suspended or dispersed in a polymer binder without being encapsulated, e.g., as disclosed in U.S. Pat. Nos. 2,229,693; 2,505,470; 2,548,365 and 2,548,366. In the latter process, a dispersion method for water-soluble couplers or a dispersion method for oil-soluble couplers well known in the filed of color photography can be used.

In this case, for hardening the coated layer, formaldehyde, chromium alum, etc., can be used together with the color formers. These techniques are described in, for instance, C. K. E. Mees & T. H. James, *The Theory of the Photographic Process*, 3rd Ed. Macmillan Co. New York (1966) and S. Kikuchi, *Shashin Kagaku (Photographic Chemistry)*, New Ed., Kyoritsu Book Co. (1968).

Of the above-described methods of using color formers, microencapsulation is most preferably employed in this invention and hence this technique will be described below in detail.

Microencapsulation for producing the recording sheets used in this invention can be practiced according to a coacervation method as described in, for instance, U.S. Pat. Nos. 2,800,457; 2,800,458; 3,041,289; and 3,687,865, an interfacial polymerization method as described in U.S. Pat. Nos. 3,492,380 and 3,577,515 and British Patent Nos. 950,433; 1,046,469; and 1,091,141, an internal polymerization method as described in British Patent No. 1,237,498, and French Patent Nos. 2,060,818 and 2,090,862, and an external polymerization method as described in British Patent No. 989,264 and Japanese Patent Publication Nos. 12380/'62; 14327/'62; 29483/'70; 7313/'71; and 30282/'71.

The color formers which can be used in this invention are colorless compounds which form color when they are brought into contact with a solid acid and can be defined as electron donating colorless organic compounds.

The method of this invention is substantially not influenced by the kind and nature of color formers used and hence any kinds of color formers can be employed in this invention. For example, triarylmethane compounds, diarylmethane compounds, xanthene compounds, thiazine compounds, spiropyran compounds, etc., e.g., as disclosed in U.S. Pat. Nos. 2,548,365; 2,548,366; 3,293,060; 3,551,181; 3,506,471; 3,514,310; 3,501,331; 3,631,064; 3,697,540; 3,681,392; 3,663,571, etc. can be used as color formers.

Specific examples of color formers which can be used in this invention are triphenylmethane compounds such as 3,3-bis-(p-dimethylaminophenyl)-6-dimethylaminophthalide (i.e., Crystal Violet Lactone), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis-(1,2-dimethylindole-3-yl)-5-dimethylaminophthalide, 3,3-bis-(1,2-dimethylindole-3-yl)-6-dimethylaminophthalide, 3,3-bis-(9-ethylcarbazole-3-yl)-5-dimethylaminophthalide, 3,3-bis-(2-phenylindole-3-yl)-dimethylaminophthalide, 3-p-dimethylaminophenyl-3-(1-methylpyrrole-2-yl)-6-dimethylaminophthalide, etc.; diphenylmethane compounds such as 4,4'-bis-dimethylaminobenzhydrin benzyl ether, N-halophenylleucoauramine, N-2,4,5-trichlorophenyl-leucoauramine, etc.; xanthene compounds such as Rhodamine-B-anilinolactam, Rhodamine-B-(p-nitroanilino)lactam, Rhodamine-B-(p-chloroanilino)lactam, 3-dimethylamino-7-methoxyfluoran, 3-diethylamino-7-methoxyfluoran, 3-diethylamino-7-chloro-6-methylfluoran, 3-diethylamino-7-(acetylmethylamino)fluoran, 3-diethylamino-7-(dibenzylamino)-fluoran, 3-diethylamino-7-(methylbenzylamino)fluoran, 3-diethylamino-7-(chloroethylmethylamino)fluoran, 3-diethylamino-7-(diethylamino)fluoran, etc.; thiazine compounds such as benzoyl leucomethylene blue, p-nitrobenzyl leucomethylene blue, etc.; and spiro compounds such as 3-methyl-spiro-dinaphthopyran, 3-ethyl-spirodinaphthopyran, 3,3'-dichloro-spirodinaphthopyran, 3-benzylspiro-dinaphthopyran, 3-methyl-naphtho- (3-methoxy-benzo)-spiropyran, 3-propyl-spiro-dibenzodipyran, etc.

In addition to the above-illustrated electron donating colorless organic compounds, the various colored pigments as described in *Shinban Ganryo Binran (New Pigment Handbook)*, 1st Ed., pages 7-49, edited by Nippon Ganryo Gijutsu Kyokai (Pigment Technical Society of Japan), published by Seibundo Shinko Sha (1968) and the various colored pigments as described in *Shikizai Kogaku Handbook (Color Material Engineering Handbook)*, 1st Ed., pages 92-226, edited by Shikizai Kyokai (Color Material Society), published by Asakura Shoten (1967) can be also used as the color formers in this invention.

Typical examples of these pigments are organic pigments such as Phthalocyanine Blue, Phthalocyanine Green, Benzidine Yellow, Hansa Yellow, Lake Red, Carmine 6B, and inorganic pigments such as ultramarine, Prussian blue, carbon black, $Fe_2O_3$, HgS, $PbCrO_4$, PbO, $TiO_2$, ZnS, $BaSO_4$, $CaCO_3$, etc.

Furthermore, dyes such as those described in, for instance, *Senryo Binran (Dye Handbook)*, edited by Yuki Gosei Kagaku Kyokai (Society of Organic Synthetic Chemistry), published by Maruzen (1970); *Color Index* by The Society of Dyers and Colourists England; etc.; can also be used in this invention.

For instance, example of such dyes, are xanthene dyes (having a xanthene skeleton), triphenylmethane dyes, diphenylmethane dyes, azo dyes, bis-azo dyes, polyazo dyes, anthraquinone dyes, and the like.

Examples of xanthene dyes are, for instance Fluoresceine (C.I. 45,350), Rose Bengale (C.I. 45,440), Eosine B (C.I. 45,400), Rhodamine B (C.I. 45,170), Rhodamine 6 GCP, Acid Red 45 (C.I. 45,386), Acid Red 51 (C.I. 45,430), Rhodamine 6G (C.I. 45,160), Rhodamine S (C.I. 45,050), Rhodamine 5G, Rhodamine 3G, Methylene Red, Eosine G, Tetraiodofluoresceine, and Diiodofluoresceine.

Examples of triphenylmethane dyes and diphenylmethane dyes are, for instance, Crystal Violet (C.I. 42,555), Crystal Ponso (C.I. 16,250), Malachite Green (C.I. 42,000), Victoria Blue (C.I. 44,045), Brilliant Green (C.I. 42,040), Basic Yellow 2 (C.I. 41,000), Tetrabromophenol Blue, Bromophenol Red, Methyl Violet, Victoria Blue Base, Acid Violet, Night Blue, Cyanine B, Eosine Bluish (C.I. 45,400), Eosine Yellowish (C.I. 45,380), Auramine, Erichrome Azurol B (C.I. 43,830), Eriochrome Cyanine R (C.I. 43,820), C.I. Acid Blue 1 (C.I. 42,045), C.I. Acid Blue 147 (C.I. 42,135), C.I. Acid Green 3 (C.I. 42,085), C.I. Acid Green 5 (C.I. 42,095), and C.I. Solvent Green 15 (C.I. 42,055).

These dyes are also described in British Patent Nos. 446,583 and 790,023.

Examples of azo dyes are, for instance, Acid Red (C.I. 45,100), Eriochrome Black A (C.I. 15,710), Eriochrome Black T (C.I. 14,645), Eriochrome Blue-Black B (C.I. 14,640), Eriochrome Blue-Black R (C.I. 15,705), Eriochrome Red B (C.I. 18,760), Sudan Yellow (C.I. 12,055), Sudan II (C.I. 12,140), Sudan III (C.I. 26,100), Oil Red (C.I. 26,105), Sudan Yellow RA (C.I. 11,000), Sudan Orange R (C.I. 12,055), Oil Yellow BB (C.I. 11,020), Congo Red, Tartrazine (C.I. 19,140), Basic Orange 2 (C.I. 11,270), and Direct Violet (C.I. 22,570). Other examples of azo dyes are those as described in U.S. Pat. No. 2,596,879 and German Patent No. 1,182,067.

Examples of acridine dyes are, for instance, Acridine Orange (C.I. 46,005), Acridine Red (C.I. 45,000), Acridine Yellow (C.I. 46,025), and Acridine Orange 2G.

Examples of methine dyes are, for instance, Basic Yellow 33 and Basic Red 35.

Examples of quinoline dyes are, for instance, Acid Yellow 3 (C.I. 47,005), Dicyanine A, Quinoline Red, Qinoline Blue, Ethyl Red, Orthochrome T, Pinachrome Violet, and Pinachrome Blue.

Examples of anthraquinone dyes are, for instance, Acid Blue 27 (C.I. 61,530) and Acid Blue 54.

Other examples of dyes which can be used in this invention are, for instance, Alizarine, Alizarine Garnet, quinizarine, Safranine T, morin, sulfophthalein, Sudan Black (C.I. 26,150), etc. Furthermore, the acid dyes, basic dyes, and various dyes which are commercially available by the following trade names can be also used in this invention.

That is, examples of the acid dyes are, for instance, Acid Alizarine Blue B (C.I. 16,680), Acid Anthracene Brown PG (C.I. 17,590), Acid Anthracene Brown R (C.I. 13,265), Acid Blue 20 (C.I. 50,405), Acid Brilliant Green J (C.I. 44,025), Acid Brown M (C.I. 20,195), Acid Cyanine B (C.I. 42,660), Acid Fast Green (C.I. 42,100), Acid Fast Yellow G (C.I. 18,965), Acid Fuchsine (C.I. 42,685), Acid Green B (C.I. 42,085), Acid Green GG (C.I. 42,095), Acid Light Yellow 2G (C.I. 18,965), Acid Red (C.I. 45,100), Acid Yellow 3 (C.I. 47,005), Acid Red 51 (C.I. 45,430), Acid Blue 27 (C.I. 61,350), Acid Blue 54, Acid Yellow 7 (C.I. 56,205), Acid Yellow 23 (C.I. 19,140), Acid Red 1 (C.I. 18,050), Acid Red 52 (C.I. 45,100), Acid Blue 9 (C.I. 42,090), Acid Blue 45, Acid Blue 62 (C.I. 62,045), Acid Violet 7 (C.I. 18,055), Acid Black 10B (C.I. 20,470), Kayacleanser Black B (C.I. 30,336), Kayanol Milling Black TLR, Brilliant Acid Blue (C.I. 42,051), Brilliant Acid Green (C.I. 42,100), etc.

Examples of basic dyes are, for instance, Basic Yellow 2 (C.I. 41,000), Basic Yellow 23, Basic Red 35, Basic Yellow 1 (C.I. 49,005), Basic Red 1 (Rhodamine 6 GLP) (C.I. 45,160), Basic Red 2 (C.I. 50,240), Basic Blue 25 (C.I. 52,025), Basic Violet 3 (C.I. 42,555), Basic Violet 10 (C.I. 45,170), Basic Violet 3, Basic Blue GO (C.I. Basic Blue 25), Deorlene Blue 5G (C.I. Basic Blue 3), Dienus Black BR (C.I. 11,825), C.I. Basic Black 2, Auramine 0-100 (C.I. Basic Yellow 2), Brilliant Basic Cyanine (C.I. 42,025), Alkali Blue B (C.I. 704), etc.

Examples of oil dyes are, for instance, Oil Orange (C.I. 12,055), Oil Black 2HB (C.I. 50,415), Oil Blue G extra (C.I. 61,525), Oil Orange SS (C.I. 12,100), Oil Red (C.I. 26,105), Oil Red AS (C.I. 26,100), Oil Red XO (C.I. 12,140), Oil Violet (C.I. 26,050), Oil Yellow AB (C.I. 11,380), Oil Yellow OB (C.I. 11,390), Nigrosine Solvent Souble (C.I. 864), Spirit Blue CR (C.I. 689), Oil Blue N, Sirius Red 4B, C.I. Disperse Violet 4 (C.I. 61,105), etc.

The dyes illustrated above can be used individually or as a combination of two or more if desired.

The pigments or dyes described above can be used in microencapsulated forms or can be used in a dispersed form in a layer.

In using pigments, they can be easily dispersed without any difficulty but in the case of using dyes, it is advantageous to use them together with a binder which does not substantially disperse the dyes therein. For instance, in using oil-soluble dyes, it is advantageous to use them together with a hydrophilic binder such as gelatin, polyvinyl alcohol, polyhydroxyethyl methacrylate, and a styrene-butadiene latex and further in using hydrophilic dyes, it is advantageous to use them together with polybutyl methacrylate, chlorinated paraffin, a copolymer of vinyl chloride and vinyl acetate, or paraffin. Of these dyes, it is more desirable to use oil-soluble dyes.

In dispersing these oil-soluble dyes in the above-described binder, it is advantageous to initially dissolve the dyes in a solvent such as dibutyl phthalate, di-t-amylnaphthalene, diisopropylnaphthalene, tributyl diphenylmethane, triphenyl phosphite, etc. In this case, an organic solvent such as ethyl acetate, methyl ethyl ketone, etc., and a surface active agent such as sodium dodecylbenzenesulfonate, sorbitan monolaurate, nonyloxypolyethylene oxide, etc., may be used.

The above-indicated color formers can be used individually or as a mixture of two or more if desired.

When the color former or color formers are disolved as a solution and microencapsulated, any solvents which can dissolve the color former or color formers can be used without any restriction thereon. Examples of suitable solvents which can be used for this purpose are aromatic synthetic oils such as alkylated naphthalene, alkylated biphenyl, hydrogenated terphenyl, alkylated diphenylmethane, etc. the number of carbon atoms in each alkyl group ranging from 1 to 5 and the number of alkyl groups ranging from 1 to 4; petroleum fractions such as kerosene, naphtha, paraffin oil, etc., vegetable oils such as cotton seen oil, soy bean oil, linseed oil, etc., and mixtures thereof. There is no particular limitation on the concentration of the color formers in the solution thereof. A suitable concentration for the color former can range from about 0.1 to about 50% by weight, preferably 0.5 to 20% by weight.

The solution of the color former or color formers in the solvent as illustrated above is then encapsulated to form a microcapsule-containing coating solution. It is desirable that the microcapsules used in this invention are of mononuclear type but they may be of polynuclear type. Also, the size of the microcapsules used in this invention is ordinarily from about 0.1 to about 100 microns, preferably from about 0.5 to about 50 microns.

The microcapsule-containing coating composition is usually a dispersion of microcapsules and hence it may be coated on a support as it is. Also, the dispersion of microcapsules may be coated on a support with the addition of a binder such as, for instance, a latex (e.g., a styrene-butadiene-rubber latex), a water-soluble polymer (e.g., starch, carboxymethyl cellulose, polyvinyl alcohol, gum arabic, casein, gelatin, etc.,), and the like. Furthermore, a capsule reinforcing agent such as a cellulose fine powder (U.S. Pat. No. 2,711,375), a polymer fine powder (U.S. Pat. No. 3,625,736), a starch fine powder (British Patent No. 1,232,347), and microcapsules which do not contain any color former (British Patent No. 1,235,991) can be incorporated in the capsule-containing coating composition or a capsule-containing layer. It is preferred that the capsule reinforcing agent not be present in layer form but be scattered in the layer of microcapsules or on the surface portion of the microcapsule layer. It is also preferred that the coverage of the microcapsules coated be from about 0.5 to about 17 g/m$^2$, in particular from about 2 to 6 g/m$^2$.

The planar figures of the embossed patterns of the sheet material having regular embossed patterns used in this invention are generally triangle patterns, square patterns, pentagonal patterns, hexagonal patterns, heptagonal patterns, octagonal patterns, rhombic patterns, star-shaped patterns, striped patterns, parallelogramic patterns, oval patterns, or circular patterns. The shape of the horizontal cross section of the regular embossed patterns is a series of triangles, squares, pentagons, trapezoids, circles, semi-circles, ovals, semi-ovals, etc., and in this case, a part of the lines of the cross sectional figure may be replaced with a curve or a part of the curves of the figure may be replaced with a line. Furthermore, these figures can be regularly distributed or as a combination of two or more figures as described above. It is preferred from the view point of the precision in measurement that the size of each figure be smaller than about 1,000 mesh, in particular, 5 to 200 mesh. Moreover, it is preferred that the depth of the embossed patterns range from about 3 microns to about 3,000 microns, in particular, from 50 microns to 1,000 microns.

The patterns of the sheet material having the regular embossed patterns used in this invention may be woven or knitted patterns of, for instance, knittings, cloths, or nettings but a sheet material having regular patterns need not always be such a woven or knitted material but may be, for instance, plastic nets or sand papers.

The pattern illustrated above can be formed on the sheet material by an embossing method, if desired. One embossing method is a plate embossing method in which a metal plate having carved or marked thereon a pattern of a form opposite to the form of a desired pattern in a concave-convex relationship is pressed onto the surface of the sheet material to form the desired pattern thereon. In particular, when the sheet material employed is a thermoplastic sheet, a metal plate is often used at a definite temperature. Another embodiment of the embossing method is a roll embossing method in which a sheet material is inserted between a metal roll having carved or marked on the surface thereof a pattern of a form opposite to the form of a desired pattern in a concave-convex relationship and a roll covered by hard rubber or cotton and the support is pressed therebetween by rotating the rolls to form the desired pattern on the surface of the sheet material. In this case also, when the sheet material employed is a thermoplastic sheet, the metal roll is often kept at a definite temperature.

Still another embodiment of the embossing method is a melt extrusion embossing method in which, in the case of forming a sheet of a thermoplastic polymer by melt extrusion, the sheet formed is pressed onto a cooling roll having carved or marked on the surface thereof a pattern of a form opposite to the form of the desired pattern in a concave-convex relationship by means of a nip roll to form the desired pattern on the surface of the plastic sheet.

A dissolution removal method can also be employed for forming a pattern as illustrated above on the surface of a sheet material. That is, in the dissolution removal method, solid particles are dispersed in a resin or polymer and, after forming a sheet of the resin or polymer by extrusion, etc., the solid particles are dissolved out to form a concave pattern on the surface of the sheet. In this case, it is desirable that the solid particles have a size of about 10 to about 250 mesh and have a uniform shape. When, for example, polyethylene is used as the material forming the sheet material, particles of sodium carbonate, sodium sulfate, magnesium sulfate, calcium sulfate, polystyrene, polymethyl methacrylate, etc., are used as the solid particles to be dispersed therein. By dissolving out the solid particles as illustrated above dispersed in the polymer sheet, concave portions and convex portions are regularly formed on the surface of the sheet.

As the material for the sheet material having regular embossed patterns, polyethylene, polypropylene, polyethylene terephthalate, polystyrene, nylon, polycarbonate, polyvinyl chloride, polysulfone, polyimide, polytetrafluoroethylene, methyl methacrylate, polyvinyl alcohol, cellulose triacetate, ethylene-acrylic acid copolymer, ethylene-sodium acrylate copolymer, ethylene-acrylic acid-sodium acrylate copolymer, ethylene-zinc acrylate copolymer, ethylene-methacrylic acid copolymer, ethylene-sodium methacrylate copolymer, ethylene-methacrylic acid-sodium methacrylate copolymer, ethylene-vinylsulfonic acid copolymer, ethylenevinyl acetate copolymer, propylenic copolymers, vinyl chloride copolymers, styrenic copolymers, and blends of these polymers and/or copolymers can be used.

In addition to the synthetic polymers as illustrated above, natural polymers such as papers, gelatin, etc., can be also used for the purpose. In case of papers, papers manufactured from a synthetic pulp made of polyethylene, polypropylene, etc., or manufactured from a mixture of a synthetic pulp and a wood pulp can be also utilized.

Moreover, inorganic materials such as glass fibers and metallic foils such as aluminum foil, copper foil, iron foil, etc., can be also used for the purpose. In particular, when the portions to be measured are at a high temperature, metallic foils can be effectively used.

Furthermore, laminates of the above-described synthetic polymer sheets, natural polymer sheets, metallic foils, inorganic materials, etc., for instance, a paper having a synthetic resin laminated on one or both surfaces thereof or a metallic foil having a synthetic resin laminated on one or both surfaces can be also used. The laminate used in this invention can be prepared by lamination, melt extrusion coating, melt co-extrusion coating, plating, vacuum evaporation coating, etc. Furthermore, if desired, various surface activating methods, for instance, a physical activating method such as a corona discharge treatment, a glow discharge treatment, a flame treatment, etc., or a chemical method such as anchor coating, subbing, etc., can be employed solely or as a combination thereof for improving the adhesive property between the surface of the support and the coated layer.

It is also advantageous for the thickness of the sheet material having the regular embossed patterns to be from about 10 microns to about 4 mm.

The term "color developer" used in this specification means a solid acid, more practically an electron accepting solid acid. The color developers which can be used in this invention are described in the patents already indicated before in this specification and specific examples thereof are, for instance, clays such as acid clay, active clay, attapulgite, etc.; organic acids such as an aromatic carboxyl compound (e.g., salicylic acid), an aromatic hydroxy compound (e.g., p-t-butylphenol, p-t-amylphenol, o-chlorophenol, m-chlorophenol, p-chlorophenol, etc.,), metal salts (e.g., zinc salts) of these acids, a mixture of the above-described organic acid and a metal compound (e.g., zinc oxide), and an acid polymer (e.g., a phenol-formaldehyde resin, a phenol-acetylene resin, etc.,). Color developers which can be used in this invention are further described in U.S. Pat. Nos. 3,501,331; 3,669,711; 3,427,180; 3,455,721; 3,516,845; 3,634,121; 3,627,935; and 3,732,120 and Japanese Patent Publication Nos. 48545/'70; 49339/'70; 93245/'70; 92246/'70; 93247/'70; 94874/'70; 109872/'70; 112038/'70; 112039/'70; 112040/'70; 112753/'70; 112754/'70; 118978/'70; 118979/'70; and 86950/'71.

The color developer can be coated on a support together with a binder. In this case, the support materials illustrated above in regard to the color former-containing coating compositions can be also used. Examples of suitable binders which can be used together with the color developer are, for instance, a styrenebutadiene rubber latex; a styrene-butadiene-acrylonitrile latex; water-soluble natural polymers such as proteins (e.g., gelatin, gum arabic, albumin, casein, etc.,), celluloses (e.g., carboxymethyl cellulose, hydroxyethyl cellulose, etc.,), and saccharoses (e.g., agar agar, sodium alginate, starch, carboxymethyl starch, etc.,); water-soluble synthetic polymers such as polyvinyl alcohol, polyvinyl pyrrolidone, polyacrylic acid, polyacrylamide, etc.; and organic solvent-soluble polymers such as nitrocellulose, ethyl cellulose, polyesters, polyvinyl acetate, polyvinylidene chloride, vinyl chloride-vinylidene chloride copolymers, etc. These binders can be also used as the binder for the microcapsule-containing dispersion as described before. The color developer-containing layer may further contain additives conventionally used in the field of pressure-sensitive recording sheets or papers. A suitable coating amount for the color developer can range from about 0.5 to 30 g/m$^2$, preferably 2 to 20 g/m$^2$.

The characteristics required for the pressure measuring method of this invention are first that a co-relationship (e.g., directly proportional or inversely proportional) exists between the pressure applied and the change in optical density of the colored images or marks formed by contact under pressure in the pressure measurement range and secondly that the measurement error is small and the measurement can be made precisely in the above-described co-relationship.

As the result of pursuing a series of investigations, it has now been discovered that pressures such as face pressures and line pressures can be measured at high precision in a simple manner by measuring the pressure through the sheet material having regular embossed patterns inserted between the pressure-sensitive recording sheet and the portion or part to be measured.

In use of the pressure measuring method of this invention, the pressure-sensitive recording sheet and the sheet material having regular embossed patterns are placed between the parts to be measured and then a pressure is applied to the assembly, whereby the recording sheet is colored depending on the extent of the pressure applied. Then, the optical density of the color formed on the recording sheet is measured to know the pressure value applied. The pressure value can be determined using a conventional means such as a densitometer or can be determined using a table or a working curve prepared beforehand for showing the relationship between the change of the optical density and the pressure applied.

The pressure measuring method of this invention is very simple as compared with conventional methods of measuring face pressure, line pressure, etc., using a strain gauge, a load meter, a pressure-sensitive paint, etc., and further possesses the advantages that large pieces of equipment such as an amplifier, a detector, a recorder, etc., are not needed and highly skilled techniques and complicated calculations are not required.

Furthermore, while the pressure values measured by conventional methods are mostly obtained by point measurement, in the pressure measuring method of this invention, face pressure, line pressure, etc., can be measured over a broad range of pressures and further the pattern of the pressure distribution thus measured can be stored in a simple manner for a long period of time as a record thereof formed on the recording sheet.

Moreover, the method of this invention can be practiced without the difficulties that the hand and clothes are stained and the sheet is colored too much as in the case of using pressure-sensitive laminates.

Still further, the pressure measuring method of this invention has the advantage that the colored image formed by the method does not have an irregular localized unevenness in the optical density of the recorded image and hence the value of the pressure applied can be measured with high precision.

The following examples show in greater detail the specific advantages of the pressure measuring method of this invention but as the matter of course the invention is not to be construed as being limited to these examples only. In addition, all parts, percentages, ratios and the like in these examples, unless otherwise indicated, are "by weight."

Still further, the microcapsule-containing coating compositions and the color developer-containing coating compositions used for demonstrating the advantages of the method of this invention in the examples below were prepared by the following methods.

Preparation of Microcapsule Coating Composition A

In 400 parts of water were dissolved 10 parts of pigskin acid-treated gelatin and 10 parts of gum arabic at 40° C. and after adding to the solution 0.2 part of Turkey red oil as an emulsifying agent, 40 parts of a color former-containing oil was dispersed by emulsification in the mixture. The conditions were so established that the sizes of the microcapsules formed were 2 to 3 microns on the average. The color former-containing oil used in the above procedure was prepared by dissolving 2 parts of Crystal Violet lactone in an oil mixture of 4 parts of diisopropylnaphthalene and 1 part of kerosene. Then, water at 40° C. was added to the emulsion to make 900 parts total followed by stirring. In this case, it was necessary to keep the system above 40° C. Thereafter, the pH of the system was adjusted to 4.0 – 4.2 by adding 10% acetic acid to cause coacervation. Then, after further stirring the system for 20 minutes, the system was cooled with ice-water to gel the coacervate film deposited around the oil droplets. When the temperature of the system reached 20° C., 7 parts of a 37% formaldehyde aqueous solution was added to the system. When the temperature of the system reached 10° C., 40 parts of a 7% aqueous solution of the sodium salt of carboxymethyl cellulose was added to the system and then an aqueous solution of 15% sodium hydroxide was added dropwise to the system to adjust the pH thereof to 9. In this case, the addition of sodium hydroxide was made with care. Then the temperature of the system was increased to 50° C. over a 20 minute period with stirring and thereafter, the temperature of the system was further adjusted to 30° C. to provide the microcapsule-containing coating composition.

Preparation of Microcapsule Coating Composition B

In 30 parts of alkylated diphenylmethane were dissolved 3 parts of Rhodamine B lactam and 3 parts of 3-diethylamino-7-methylfluoran and then 4 parts of the trimethylolpropane addition product of tolylene diisocyanate (1:3 molar ratio), 4 parts of the trimethylolpropane addition product of hexamethylene diisocyanate (1:3 molar ratio), and 2 parts of the propylene oxide addition product of ethylenediamine (4:1 molar ratio) were dissolved in the solution thus prepared. The resultant solution was then dispersed by emulsification in a solution prepared by dissolving 2 parts of carboxymethyl cellulose and 2 parts of polyvinyl alcohol in 40 parts of water. In this case, the conditions were so established that the sizes of the microcapsules formed were 1 to 2 microns on the average and the temperature at the emulsification was set at 20° C. After the emulsification, 150 parts of water was added to the emulsion and the mixture was heated to 70° C. with stirring. Then, after further adjusting the temperature of the mixture to 30° C., 10 parts of cellulose flock (length: about 200μ; diameter: about 5–10μ) and 5 parts of oxidized starch (particle size: about 10 to 20μ) were added to provide the microcapsule-containing coating composition.

Preparation of Color Developer Coating Composition A

A mixture of 100 parts of sulfuric acid-treated acid clay, 20 parts of nitrocellulose, and 350 parts of ethyl acetate was kneaded in a ball mill for 24 hours to produce the developer-containing coating composition.

Preparation of Color Developer Coating Composition B

A mixture of 50 parts of a p-phenylphenol-formaldehyde resin, 100 parts of butyl acetate, and 100 parts of toluene was kneaded in a ball mill for 24 hours to produce the developer-containing coating composition.

Preparation of Color Developer Coating Composition C

A mixture of 60 parts of zinc 3,5-di-tert-butylsalicylate, 20 parts of kaolin, 10 parts of ethyl cellulose, 100 parts of ethanol, and 100 parts of isopropyl acetate was kneaded in a ball mill for 24 hours to produce the developer-containing coating composition.

EXAMPLE 1

Microcapsule Coating Composition A prepared as described above was coated on a surface-treated polyethylene terephthalate sheet of a thickness of 50 microns by air knife coating at a coverage of 5 g/m$^2$ (solid content, the same hereinafter) followed by drying to provide a Recording Sheet (1).

Color Developer Coating Composition B prepared as described above was coated on a polyethylene terephthalate sheet having the same characteristic as described above by blade coating at a coverage of 6 g/m$^2$ followed by drying to produce Recording Sheet (2).

Also, a polyethylene cloth (plain weave, 67 × 61 mesh) was used as a sheet material having regular embossed patterns.

Recording sheet (1) thus prepared was superposed on Recording Sheet (2) in such a manner that the coated layer of the former faced the coated layer of the latter and then the above-indicated polyethylene cloth was superposed on the sheet assembly. The laminate assembly was mounted on a press machine whose pressing pressure could be freely changed in the range of 10 kg/cm$^2$ to 500 kg/cm$^2$ and the assembly was pressed in the press machine at a pressure of 50 kg/cm$^2$, 100 kg/cm² or 200 kg/cm². The colored density formed each case was measured using a densitometer (P-Type Densitometer made by Fuji Photo Film Co., Ltd.).

COMPARISON EXAMPLE 1

The same procedure as Example 1 was repeated except that the polyethylene cloth was not used and the color density was also measured in each case.

The results obtained in the above example and comparison example are shown in Table 1 below, in which the numerical values show the measured density values in Example 1 and Comparison Example 1 when the pressure applied was 50 kg/cm², 100 kg/cm² and 200 kg/cm², respectively, and the numerical values in the parentheses are the dispersions of the values. The measured density value shown in the table is a mean value of the density values obtained for 5 points in the colored portion and the dispersion show the difference in the upper limit and the lower limit of the measured density values.

Table 1

| Example No. | Pressure (kg/cm²) | | |
|---|---|---|---|
| | 50 | 100 | 200 |
| Example 1 | 0.22 (0.01) | 0.45 (0.02) | 0.89 (0.05) |
| Comparison Example 2 | 0.23 (0.07) | 0.60 (0.14) | 0.78 (0.21) |

As is clear from the results shown in Table 1, above the dispersion was much smaller in the method of this invention. Also, it can also be understood that a linear relationship exists between the pressure applied and the color density formed.

EXAMPLE 2

A mixture of Microcapsule Coating Composition B and Color Developer Coating Composition A in a ratio of 1 : 2 (solid content) was used as the coating composition in this example. A polyethylene terephthalate film base of a thickness of 70 microns was subjected to a surface treatment by corona discharging and a subbing layer of gelatin, ethyl alcohol, and water was coated on the film base at a dry thickness of 0.001 mm and dried to provide a support. The coating composition prepared above was coated on the support at a coverage of 20 g/m² and dried to provide a pressure-sensitive recording sheet.

A Tetoron (a trade name for a polyester synthetic fiber produced by Toray Industries) cloth (twilled fabric, 164 × 45 mesh) was superposed on the recording sheet and the assembly was pressed at 50 kg/cm², 100 kg/cm², or 200 kg/cm² as in Example 1. The color density formed was measured in each case as in Example 1. The results obtained are shown in Table 2 below.

COMPARISON EXAMPLE 2

The same procedure as in Example 2 was repeated except that the Tetoron cloth was not used. The color density was measured in each case and the results are also shown in Table 2 below

EXAMPLE 3

Microcapsule Coating Composition B was coated on a paper at a coverage of 5 g/cm² and dried to provide a pressure-measuring Recording Sheet (3). Also, Color Developer Coating Composition C was coated on an aluminum foil at a coverage of 6 g/m² and dried to provide a pressure-measuring Recording Sheet (4).

A sheet material having regular embossed patterns (the plane figure of the regular patterns were circular patterns, the cross sectional view of the patterns was semi-circular, the depth of the embossed patterns was 20 microns, the size of each of the embossed patterns was 60 mesh, and the area ratio of the concave portions to the convex portions was 1:5) was prepared. Pressure-measuring Recording Sheet (3) was superposed on pressure-measuring Recording Sheet (4) in such a manner that the coated layer of the former faced the coated layer of the latter and then the sheet material having the regular embossed patterns was also superposed on the sheet assembly. The laminate assembly was pressed at 50 kg/cm², 100 kg/cm², and 200 kg/cm², respectively, as in Example 1 and the color density formed was measured in each case as in Example 1. The results obtained are shown in Table 2 below.

COMPARISON EXAMPLE 3

The same procedure as in Example 3 was repeated except that the sheet material having the regular embossed patterns was not used and the color density formed was measured in each case. The results obtained are also shown in Table 2 below.

The numerical values shown in Table 2 below have the same significance as in Table 1.

Table 2

| Example No. | Pressure (kg/cm²) | | |
|---|---|---|---|
| | 50 | 100 | 200 |
| Example 2 | 0.23 (0.02) | 0.47 (0.01) | 0.95 (0.03) |
| Comparison Example 2 | 0.35 (0.12) | 0.85 (0.20) | 0.95 (0.25) |
| Example 3 | 0.25 (0.02) | 0.48 (0.02) | 0.98 (0.04) |
| Comparison Example 3 | 0.30 (0.09) | 0.80 (0.18) | 0.96 (0.20) |

From the results shown in Table 2, it can be understood that the dispersion was very small according to the method of this invention and also the linearity of the relationship between the pressure applied and the color density formed was excellent.

While the invention has been described in detail and with reference to specific embodiments thereof, it will be apparent to one skilled in the art that various changes and modifications can be made therein without departing from the spirit and scope thereof.

What is claimed is:

1. In a pressure measuring method in which a pressure applied to a part or parts is detected by applying the pressure to the part or parts using a pressure-sensitive recording sheet on which the color density formed is related to the pressure applied and which is in contact with said part or parts and evaluating the color density formed, the improvement which comprises applying the pressure while interposing a sheet material having regular embossed patterns between said part and said pressure-sensitive recording sheet.

2. The pressure measuring method of claim 1, wherein said sheet material having regular embossed patterns is a woven or knitted cloth.

3. The pressure measuring method claim 1, wherein said sheet material having regular embossed patterns is a sheet having regular embossed patterns formed on the surface thereof.

4. The pressure measuring method of claim 1, wherein the size of the regular embossed patterns of the sheet material is about 5 to 200 mesh.

5. The pressure measuring method of claim 1, wherein the depth of the regular embossed patterns of the sheet material ranges from about 3 microns to about 3,000 microns.

6. The pressure measuring method of claim 5 wherein the depth of the regular embossed patterns ranges from 50 microns to 1,000 microns.

7. The pressure measuring method of claim 1, wherein the thickness of said sheet material having regular embossed patterns therein is from about 10 microns to about 4 mm.

8. The pressure measuring method of claim 1, wherein said pressure-sensitive recording sheet comprises an assembly of (a) a sheet having coated thereon microcapsules containing a color former or color formers capable of forming color when brought into contact with a color developer and (b) a sheet having coated thereon the color developer.

9. The pressure measuring method of claim 1, wherein said pressure-sensitive recording sheet comprises (a) a sheet having coated thereon microcapsules containing a color former or color formers capable of forming color when brought into contact with a color developer and (b) a color developer, in a layer or layers.

* * * * *